(Model.)

E. T. ALLING.
CONVERTING MOTION.

No. 268,973.          Patented Dec. 12, 1882.

WITNESSES:
C. Neveux
T. Sedgwick

INVENTOR:
E. T. Alling
BY Munn & Co.
ATTORNEYS.

UNITED STATES PATENT OFFICE.

EDWARD T. ALLING, OF MILLEDGEVILLE, GEORGIA.

CONVERTING MOTION.

SPECIFICATION forming part of Letters Patent No. 268,973, dated December 12, 1882.

Application filed May 25, 1882. (Model.)

*To all whom it may concern:*

Be it known that I, EDWARD T. ALLING, of Milledgeville, in the county of Baldwin and State of Georgia, have invented a new and useful Improvement in Converting Motion, of which the following is a full, clear, and exact description.

My improved power mechanism is especially intended for use when power and not speed is desired.

The nature of this invention consists of shafts upon which are keyed or fixed ratchet-wheels having oppositely-pointed teeth and meshing or gearing pinions, combined with drums sleeved loosely upon said shafts and surrounding the said ratchets, and provided with spring-pawls which engage the ratchets, said drums having also depending arms connected to a reciprocating rod, substantially as hereinafter more fully set forth and claimed.

Reference is to be had to the accompanying drawings, forming a part of this specification, in which similar letters of reference indicate corresponding parts in both the figures.

Figure 1:
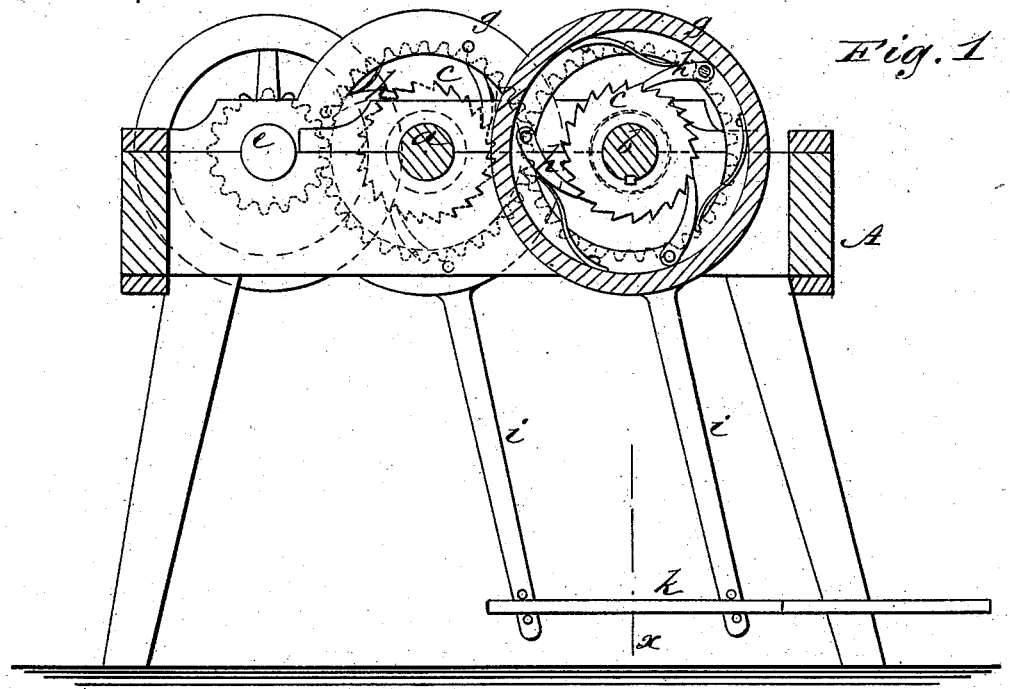
Figure 2:
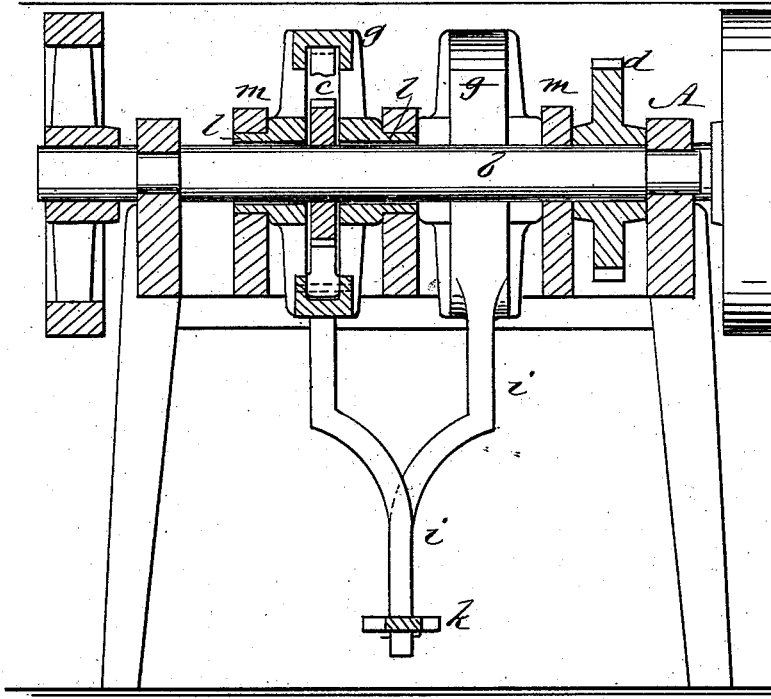

Figure 1 is a sectional side view of my improved machine. Fig. 2 is a vertical transverse section of the same on line $x$ $x$ of Fig. 1.

A is the frame of the machine, across which two shafts, $a$ $b$, are supported in boxes $m$. On these shafts are fixed ratchet-wheels $c$ $c$, and the shafts are connected by gearing $d$, the gearing also connecting to a third shaft, $e$, on which is a balance-wheel. On the shafts $a$ $b$ are wheels $g$ $g$, which are loose and inclose or have their rims projecting over the wheels $c$. Upon the under side of the rims of the wheels $g$ pawls $h$ $h$ are pivoted, and these pawls engage the ratchet-wheels. From the wheels $g$ arms $i$ extend for connection to a rod, K, that is to be reciprocated.

The operation is as follows: By the reciprocation of the rod K, wheels $g$ $g$ are reciprocated upon the shafts $a$ $b$, and by the engagement of the pawls $h$ with the ratchet-wheels the shafts $a$ $b$ are rotated. The ratchet-wheels being in reverse, the movement of the rod K in one direction acts to give a forward movement to one of the shafts, and its movement in the other direction gives a forward movement to the other shaft, each shaft being thereby given an intermittent rotary motion by means of the rod K; but the two shafts being geared together, each is moved by the rotation of the other, and a continuous rotary movement in one direction is given to the third shaft, $e$, from which the power is to be taken. The pawls are provided with springs for retaining them in contact with the ratchet-wheels, and to relieve the shafts $a$ $b$ from the weight of the wheels $g$ the wheels are formed with tubular hubs $l$, that extend into the boxes of the shaft, as shown in Fig. 2, so that the boxes support the ratchet-wheels and the shafts revolve freely in the hubs.

In this power mechanism there is no loss by change in direction, and there are no dead-centers. The mechanism may be operated by hand or power, and may be used for any purpose where a slow, steady power is required.

The apparatus may be speeded by gearing to any extent required.

Having thus described my invention, I claim as new and desire to secure by Letters Patent—

In mechanism for converting motion, the combination, with the shafts $a$ $b$, having engaging pinions or gear-wheels $d$ $d$, and upon which are keyed or fixed the ratchet-wheels $c$ $c$, having oppositely-pointed teeth, of the drums $g$, sleeved loosely upon said shafts and surrounding the said ratchets, and provided with spring-pawls $h$, arranged to engage the oppositely-pointed teeth of the ratchets, said drums having also depending arms $i$ and the operating or reciprocating rod K, substantially as and for the purpose set forth.

EDWARD THOMAS ALLING.

Witnesses:
THOS. BRANTLEY,
A. J. CARR.